(12) United States Patent
Shah et al.

(10) Patent No.: US 8,767,932 B2
(45) Date of Patent: *Jul. 1, 2014

(54) ACCESSING A CALENDAR SERVER TO FACILITATE INITIATION OF A SCHEDULED CALL

(75) Inventors: Krutarth M. Shah, Fremont, CA (US); Satyavrat A. Prabhune, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 13/027,839

(22) Filed: Feb. 15, 2011

(65) Prior Publication Data

US 2011/0135079 A1 Jun. 9, 2011

Related U.S. Application Data

(63) Continuation of application No. 11/483,815, filed on Jul. 10, 2006, now Pat. No. 7,889,851.

(60) Provisional application No. 60/794,016, filed on Apr. 20, 2006.

(51) Int. Cl.
*H04M 3/42* (2006.01)

(52) U.S. Cl.
USPC ..................................... 379/201.01; 379/158

(58) Field of Classification Search
USPC ............ 379/202.01, 203.01, 204.01, 205.01, 379/206.01, 207.01, 158
See application file for complete search history.

(56) References Cited

U.S. PATENT DOCUMENTS

| | | |
|---|---|---|
| 5,408,526 A | 4/1995 | McFarland et al. |
| 5,544,237 A | 8/1996 | Bales et al. |
| 5,781,731 A | 7/1998 | Koreeda et al. |
| 5,812,652 A | 9/1998 | Jodoin et al. |
| 5,884,039 A | 3/1999 | Ludwig et al. |
| 6,035,036 A | 3/2000 | Eisenbraun et al. |
| 6,374,102 B1 | 4/2002 | Brachman et al. |
| 6,731,732 B2 | 5/2004 | Creamer et al. |
| 6,760,423 B1 | 7/2004 | Todd |
| 6,771,766 B1 | 8/2004 | Shafiee et al. |
| 6,801,604 B2 | 10/2004 | Maes et al. |
| 6,870,916 B2 | 3/2005 | Henrikson et al. |
| 6,941,349 B2 | 9/2005 | Godfrey et al. |
| 7,054,918 B2 | 5/2006 | Polcyn |

(Continued)

OTHER PUBLICATIONS

Prabhune et al., U.S. Appl. No. 12/048,724 patent application filed Mar. 14, 2008 entitled *One Button Conference Initiation*, Mar. 14, 2008.

(Continued)

*Primary Examiner* — William Deane, Jr.
(74) *Attorney, Agent, or Firm* — Baker Botts L.L.P.

(57) ABSTRACT

A conference control server accesses a calendar server in order to identify calls scheduled by an organizer and to facilitate initiation of the calls at the scheduled time. A method for integrating the calendar server and the conference control server includes identifying a plurality of resources, which each have a resource identifier, and registering to receive notifications of updates to those resources. If update notifications are received, the conference control server determines meeting information for a scheduled conference indicated by the update notifications. The conference control server may also provide a portion of the meeting information to a resource identified by the meeting information.

20 Claims, 6 Drawing Sheets

(56) References Cited

U.S. PATENT DOCUMENTS

| | | |
|---|---|---|
| 7,152,093 B2 | 12/2006 | Ludwig et al. |
| 7,206,809 B2 | 4/2007 | Ludwig et al. |
| 7,233,589 B2 | 6/2007 | Tanigawa et al. |
| 7,593,354 B2 | 9/2009 | Surin et al. |
| 7,889,851 B2 * | 2/2011 | Shah et al. ............ 379/202.01 |
| 2001/0014866 A1 | 8/2001 | Conmy |
| 2002/0123895 A1 | 9/2002 | Potekhin et al. |
| 2002/0184373 A1 | 12/2002 | Maes |
| 2003/0058806 A1 | 3/2003 | Meyerson et al. |
| 2003/0088421 A1 | 5/2003 | Maes et al. |
| 2004/0001446 A1 | 1/2004 | Bhatia et al. |
| 2004/0064355 A1 | 4/2004 | Dorenbosch et al. |
| 2004/0107255 A1 | 6/2004 | Ludwig et al. |
| 2004/0240650 A1 | 12/2004 | Bear et al. |
| 2005/0002514 A1 | 1/2005 | Shafiee et al. |
| 2005/0078171 A1 | 4/2005 | Firestone et al. |
| 2005/0267975 A1 * | 12/2005 | Qureshi et al. ............ 709/229 |
| 2006/0015376 A1 | 1/2006 | Sattler et al. |
| 2006/0023062 A1 | 2/2006 | Elbaze et al. |
| 2006/0026002 A1 | 2/2006 | Potekhin et al. |
| 2006/0062367 A1 | 3/2006 | Christenson |
| 2006/0088152 A1 | 4/2006 | Green et al. |
| 2007/0223675 A1 | 9/2007 | Surin et al. |
| 2008/0063173 A1 | 3/2008 | Sarkar et al. |
| 2009/0043627 A1 | 2/2009 | Vaidya et al. |

OTHER PUBLICATIONS

Kalipatnapu et al., U.S. Appl. No. 12/050,581 patent application filed Mar. 18, 2008 entitled *Establishing a Remotely Hosted Conference Initiated with One Button Push*, Mar. 18, 2008.

Kalipatnapu et al., U.S. Appl. No. 12/050,581 *Establishing a Remotely Hosted Conference Initiated with One Button Push*, communication from the U.S. Patent and Trademark Office mailed Apr. 6, 2010.

PCT Notification of Transmittal of the International Search Report and the Written Opinion of the ISA, or the Declaration for PCT/US2007/09507; ISA/US; 7 pages, Aug. 21, 2008.

The Third Office Action issued by The Patent Office of The People's Republic of China for Application No. 200780014147.4, Sep. 4, 2012.

* cited by examiner

ACCESSING A CALENDAR SERVER TO FACILITATE INITIATION OF A SCHEDULED CALL

RELATED APPLICATIONS

This application is a continuation of U.S. application Ser. No. 11/483,815 filed Jul. 10, 2006 and entitled "Accessing a Calendar Server to Facilitate Initiation of a Scheduled Call" which claims priority to U.S. patent application Ser. No. 60/794,016, entitled "Videoconferencing System," filed on Apr. 20, 2006.

TECHNICAL FIELD OF THE INVENTION

The present invention relates generally to telecommunications and, more particularly, to accessing a calendar server to facilitate initiation of a scheduled call.

BACKGROUND OF THE INVENTION

In video conferencing, call endpoints transmit both audio and video signals, allowing an individual to both hear the voice of and see a remote individual with whom he is conversing. However, in some cases, these video conferences require certain resources, such as specialized equipment. Also, initiation of a video conference connection may entail a complicated or time consuming setup and/or call establishment procedure.

SUMMARY

In accordance with the present invention, techniques for accessing a calendar server to facilitate initiation of a scheduled call are provided. According to particular embodiments, these techniques describe a conference control server that accesses a calendar server to identify calls scheduled by an organizer and to facilitate initiation of the calls at the scheduled time.

According to a particular embodiment, a method for integrating a calendar server and a conference control server comprises identifying a plurality of conferencing resources. Each of the conferencing resources has an associated resource identifier. For each of the conferencing resources, a calendar server is registered with using the associated resource identifier to request notifications of updates to a calendar associated with the resource identifier. A first update notification, which indicates a first one of the resource identifiers, is received from the calendar server. A second update notification, which indicates a second one of the resource identifiers, is received from the calendar server. Meeting information for a scheduled call indicated by the first update notification and the second update notification is determined. The meeting information comprises a scheduled time and identifies a first one of the conferencing resources associated with the first resource identifier and a second one of the conferencing resources associated with the second resource identifier. The meeting information further comprises a contact identifier for the second conferencing resource. At least a portion of the meeting information is provided to the first conferencing resource, where the portion comprises the scheduled time and the contact identifier.

Embodiments of the invention provide various technical advantages. For example, these techniques may make it easier for an organizer to reserve rooms, equipment, bandwidth, etc. for a scheduled call. In some embodiments, a conference control server can automatically setup and establish a connection for a call scheduled by an organizer so that the call can begin at the scheduled time without any further setup by the organizer. When the call is a video conference call, the setup and establishment of a connection may require a complex and/or time consuming process. However, if a conference control server is aware of the scheduled call, the call setup and initialization can be automatically initiated. Also, in particular embodiments, a organizer can schedule a call with a calendaring application currently employed by the organizer to schedule other meetings, activities, and deadlines. In certain embodiments, the privacy of individuals can be maintained while call initialization and resource reservation occurs because the conference control server accesses the calendars for the resources, rather than for the individuals, in order to determine calls that are scheduled and the details of the scheduled call. Certain embodiments provide interaction with calendaring applications to obtain scheduling information for conferencing resources while minimizing the drain on the calendaring applications.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which.

DETAILED DESCRIPTION OF THE DRAWINGS

Figure 1:
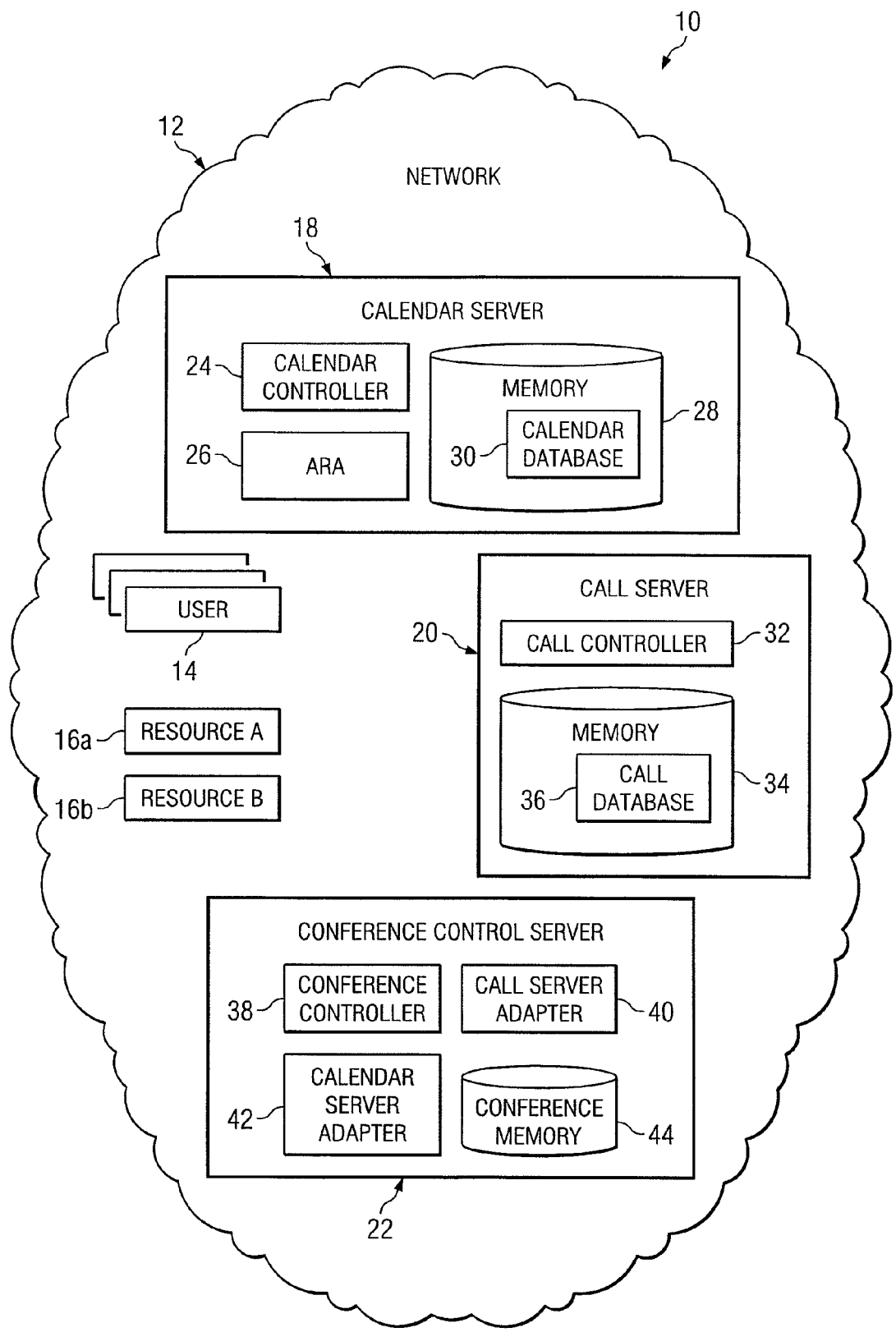
FIG. 1 illustrates a system in which a calendar server can be accessed to facilitate initiation of a scheduled call.

FIG. 1 illustrates a system, indicated generally at 10, in which a calendar server can be accessed to facilitate initiation of a scheduled call. As illustrated, system 10 includes a network 12. In general, elements within network 12 interoperate to facilitate the identification of scheduled calls and the initiation of those calls at the scheduled time.

Network 12 represents any suitable collection of hardware, software, and controlling logic to interconnect elements coupled to network 12. Thus, network 12 provides an infrastructure to support communications between attached devices. In particular embodiments, network 12 may include one or multiple networks such as a telecommunications network, a satellite network, a cable network, local area networks (LANs), wide area networks (WANs), the Internet, and/or any other appropriate networks. As illustrated, network 12 includes users 14, resources 16, a calendar server 18, a call server 20, and a conference control server 22. Elements within network 12 interconnect using any suitable techniques or protocols.

Users 14 may be any devices or elements used by an individual to interact with devices or elements in network 12. In particular embodiments, an organizer employs user 14 to interact with calendar server 18 and call server 20. User 14 may be a single device or may be multiple devices. In certain embodiments, these devices can include a personal computer, telephone, mobile device, and personal digital assistant (PDA), etc. In some embodiments, user 14 includes a calendar application on a personal computer, mobile device, personal digital assistant (PDA), or the like in order to communicate with the calendar server. In particular embodiments, an organizer can, through user 14, request resources 16 for use during a call by specifying that the particular resources 16 are required participants of the meeting. As used herein, a call is a type of meeting; however, it is understood that any type of meeting scheduled by an organizer may be used in the illustrated and described embodiments, even though scheduled calls are predominantly used as an example. In certain embodiments, an organizer employs one or more of resources 16 or other call-enabled devices to initiate scheduled voice, audio, and/or data calls. In some embodiments, an individual interacting with the system through user 14 has a user account registered with calendar server 18. The user account may include a login name, password, email account, calendar account, or any other suitable features. While network 12 is depicted as including three users 14, it is understood that network 12 may include any appropriate number of users 14.

Resources 16 may include any device, set of devices, location, or anything having utility to an organizer or elements in network 12. In the illustrated embodiment, resources 16*a* and 16*b* are depicted. In particular embodiments, resources 16 are conference rooms that include specialized equipment for initiating video conferences. Conferencing resources 16 may be used in a video, audio, and/or data conference call that has two or more call-enabled endpoints. In some embodiments, the conferencing resources 16 are call-enabled endpoints. Resources 16 may also include telephones, mobile devices, web cameras, processing power on a server, audio/visual equipment, conference bridges, bandwidth across a limited bandwidth connection, or any other equipment that may be reserved. In particular embodiments, each resource 16 is provided with a resource identifier in order to identify that particular resource 16. In certain embodiments, calendar server 18 maintains a user account for each of resources 16 to function as the resource identifier, similar to the user account corresponding to user 14. Providing resources 16 with a user account facilitates identification of each resource 16, and user 14 may more easily identify resources 16 as required meeting participants. In other embodiments, resources 16 maintain an identification number as a resource identifier. While network 12 is depicted as including only two resources 16, it is understood that network 12 may include any appropriate number of resources 16.

Calendar server 18 performs calendaring operations, such as receiving meeting requests, storing meetings, and providing notifications of the meetings. In particular embodiments, an organizer can schedule a call through calendar server 18 by scheduling a meeting in a calendar application on user 14. User 14 may provide the calendar application on a computer, a PDA, mobile phone, or other device. User 14 may allow an organizer to specify various aspects of a scheduled call, such as other participants in the call, the time, and duration of the call, and any required resources 16, such as conference rooms, equipment, etc. After an organizer schedules a meeting, calendar server 18 stores the information for the meeting. In some embodiments, calendar server 18 may send a notification regarding whether the meeting can be scheduled to the organizer through user 14. For example, calendar server 18 may send an acceptance notification if the required resources 16 are available at the requested time and send a decline notification if the required resources 16 are unavailable.

In particular embodiments, calendar server 18 may also support other applications such as an email server, an instant messaging application, a notes application, a tasks application, or any other suitable programs. In certain embodiments, calendar server 18 generally operates to organize individuals. For example, calendar server 18 may support MICROSOFT EXCHANGE, LOTUS NOTES, DOMINO, or other suitable applications. In some embodiments, calendar server 18 is any calendaring server or system. While described as a server having particular characteristics, calendar server 18 may be any device suitable to store calendar information for individual user accounts and resources 16. It is also understood that calendar server 18 may be formed of any suitable components or devices and may be located at one or more physical locations.

As illustrated, calendar server 18 includes a calendar controller 24, an automated reservation agent 26, and a memory 28, which includes a calendar database 30. In general, calendar controller 24 controls the operation of calendar server 18. Calendar controller 24 may receive new meeting entries, store meeting entries in memory 28, and send reminders to user 14 regarding meetings already stored in an individual's calendar. Calendar controller 24 may also provide user 14 with other notifications for individuals.

Automated reservation agent 26 is operable to accept or decline meeting invitations on behalf of resources 16. In particular embodiments, automated reservation agent 26 acts on behalf of all resources 16. For example, an organizer, through user 14, schedules a meeting specifying resource 16 as a required participant. Automated reservation agent 26 receives the meeting request on behalf of resource 16 and accesses the calendar corresponding to that resource 16. If resource 16 is available at the scheduled meeting time, then automated reservation agent 26 automatically accepts the meeting request sent by user 14 on behalf of resource 16. If, however, the calendar indicates that resource 16 is unavailable during the scheduled meeting time, then automated reservation agent 26 automatically declines the meeting request on behalf of resource 16. In certain embodiments, automated reservation agent 26 may be programmed to automatically accept or decline meeting requests on behalf of users 14. In some embodiments, an administrator specifies which resources 16 are to be handled by automated reservation agent 26. If automated reservation agent 26 does not act on behalf of one of resources 16, then an administrator may accept and decline room reservation requests manually.

Calendar server 18 also includes memory 28, which includes calendar database 30. In general, calendar database 30 stores scheduled meetings. In some embodiments, meetings are scheduled by an organizer through users 14, resources 16, or other elements or devices in network 12. Calendar database 30 may include a calendar for each of the individuals and resources 16 in network 12. Calendar server 18 may organize this information in any appropriate manner. For example, calendar server 18 may store individual calendars for individuals and resources 16. In particular embodiments, calendar server 18 stores scheduled meetings and uniquely identifies each scheduled meeting with a meeting identification (meeting ID). This meeting ID may be used by other elements in system 10 to identify the scheduled meeting. Calendar database 30 may also include an identification of which resources 16 have associated update notifications. An update notification associated with a particular resource 16 indicates that another device or element within network 12 has requested that calendar server 18 send a notification when the calendar of that resource 16 has been updated. Updating a calendar may trigger an update notification associated with that calendar. If an update notification is triggered, calendar server 18 may send an update notification to the indicated device. In particular embodiments, conference control server 22 sends an update notification request to calendar server 18 for resources 16. In certain embodiments, the update notification sent to conference control server 22 merely indicates that the calendar of the particular resource 16 has been updated. In other embodiments, the update notification provides additional information regarding the update to the calendar. In general, calendar database 30 stores any information used by calendar server 18 to provide calendaring functions and maintain calendars for individuals and resources 16.

Call server 20 coordinates the initiation, maintenance, and termination of certain voice, video, and/or data communications in network 12. In particular embodiments, call server 20 facilitates communications between endpoints in voice-over-internet-protocol (VoIP) communication sessions. In some embodiments, call server 20 stores information regarding all call-enabled endpoints that are located in network 12. These call enabled endpoints may include resources 16 or may include other devices which are not illustrated. In particular embodiments, call server 20 also maintains information regarding any communications in progress within network 12. Call server 20 may be responsible for initializing, maintaining, and terminating calls scheduled through user 14.

In the illustrated embodiment, call server 20 includes call controller 32 and memory 34, which includes call database 36. In general, call controller 32 controls the operation of call server 20. In some embodiments, call controller 32 receives call initiation requests from endpoints, coordinates establishment of calls, and ends calls when indicated by the endpoints. Call database 36 may store information regarding calls in progress within network 12. Call database 36 may also store the calling party, the called party, the endpoint type for the calling or called party, any significant routers or gateways, the type of call, or any other relevant information. In particular embodiments, call database 36 maintains a log of all call-enabled endpoints or devices in network 12, which may include resources 16 or devices comprising or associated with user 14. Call database 36 may also store the endpoint type of the call-enabled endpoints or devices in network 12.

While call server 20 is described as having a particular configuration and arrangement of modules, it should be noted that this is a logical depiction, and the components and functionality of call server 20 may be located at one or more physical locations. Also, the functionality of call server 20 may be provided by any suitable collection and arrangement of components. The functions performed by call server 20 may be accomplished by any suitable devices to coordinate the initiation, maintenance, and termination of communications in network 12.

In the illustrated embodiment, network 12 also includes conference control server 22. Conference control server 22 may access calendar server 18 to determine information regarding scheduled calls and may facilitate initiation of the scheduled calls. As illustrated, conference control server 22 includes conference controller 38, call server adapter 40, calendar adapter 42, and conference memory 44.

In general, conference controller 38 controls the operation of conference control server 22. Call server adapter 40 sends queries to and receives information from call server 20. For example, call server adapter 40 may request information regarding resources 16 from call server 20. In some embodiments, call server adapter 40 queries call server 20 in order to determine resources 16 for which to obtain calendar information. Call server 20 may respond with information regarding resources 16, for example, based on type. Conference control server 22 may then request calendar information for those resources 16 from calendar server 18. In some embodiments, call server adapter 40 also sends information regarding scheduled calls to call server 20 in order to facilitate initiation of the scheduled calls. In particular embodiments, call server adapter 40 sends information regarding scheduled calls to resources 16 who are required participants of the call.

Calendar adapter 42 sends queries to and receives information from calendar server 18. In some embodiments, calendar adapter 42 sends update notification requests for resources 16 to calendar server 18. In particular embodiments, calendar adapter 42 receives update notifications from calendar server 18. In certain embodiments, after receiving an update notification, calendar adapter 42 sends a query to calendar server 18 in order to identify the particular change or changes to the calendar of the resource 16 indicated by the update notification. In some embodiments, conference control server 22 may have an associated user account containing an email address so that calendar adapter 42 can communicate with calendar server 18 through email messages. In some embodiments, one of a plurality of calendar adapters 42 may be plugged into conference control server 22. For example, a first calendar adapter may communicate with a particular type of calendar server 18, where a second calendar adapter communicates with a different calendar server 18. This plug and play architecture may allow conference control server 22 to be added to and communicate with an existing environment that currently employs a particular calendar server 18. In certain embodiments, call server adapter 40 can be similarly replaced. Conference control server 22 also includes conference memory 44 which may store any information appropriate for conference control server 22. For example, conference memory 44 may store information regarding scheduled meetings. Conference memory 44 may also store information regarding resources 16. In some embodiments, conference memory 44 is one or more databases, files, hashes, and/or any other appropriate storage device.

While conference control server 22 is depicted as a single element containing a particular configuration and arrangement of modules, it should be noted that this is a logical depiction and the components and functionality of conference control server 22 may be located at one or more physical locations. Also the functionality of conference control server 22 may be provided by any suitable collection and arrangement of components. The functions performed by the various components of conference control server 22 may be accomplished by any suitable devices to access calendar server 18, or other similar device, in order to identify scheduled calls and to facilitate initiation of the calls at the scheduled time.

Particular embodiments of a system for accessing information regarding scheduled calls and facilitating initiation of those scheduled calls have been described and are not intended to be all inclusive. While system 10 is depicted as containing a certain configuration and arrangement of elements, it should be noted that this is a logical depiction and the components and functionality of system 10 may be combined, separated, and distributed as appropriate both logically and physically. Also the functionality of system 10 may be provided by any suitable collection and arrangement of components. The functions performed by the various components of conference control server 22 and calendar server 18 may be accomplished by any suitable devices to obtain information about scheduled call and to facilitate initiation of those scheduled calls.

Figure 2:
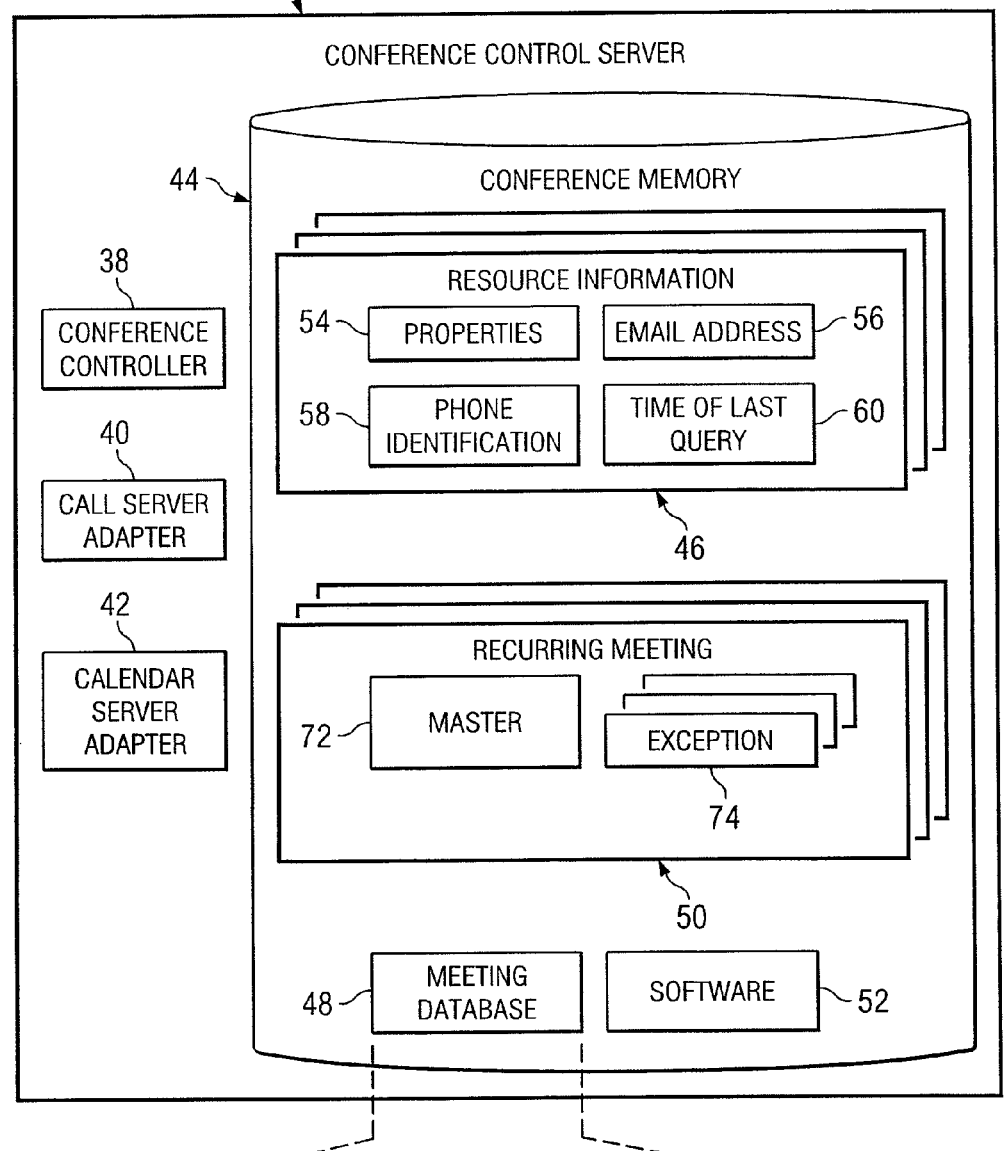
FIG. 2 illustrates a conference control server, which may access a calendar server, store information about scheduled calls, and facilitate initiation of the scheduled calls.

FIG. 2 illustrates conference control server 22, which may access calendar server 18, store information about scheduled calls, and facilitate initiation of the scheduled calls. As illustrated, conference control server 22 includes conference controller 38, call server adapter 40, calendar server adapter 42, and conference memory 44. As described with respect to FIG. 1, conference controller 38, call server adapter 40, and calendar server adapter 42 operate to control the operations of conference control server 22 and the interaction of conference control server 22 with calendar server 18 and call server 20.

In the illustrated embodiment, conference memory 44 includes resource information 46, meeting database 48, recurring meeting 50, and software 52. Resource information 46 stores information regarding resources 16 in network 12. In some embodiments, resource information 46 includes data for every resource 16 in network 12; however, in other embodiments, only some resources 16 are maintained by conference control server 22. In certain embodiments, conference control server 22 learns of the existence of resources 16 from call server 20, for example by the method shown in FIG. 4B. In other embodiments, the existence of resources 16 can be discovered from another element in network 12 or entered into conference control server 22 by an administrator.

Resource information 46 may include a plurality of different types of information for each resource. In the illustrated embodiment, resource information 46 includes properties 54, an email address 56, phone identification 58, and a time of last query 60 for each resource 16. Properties 54 may include any suitable information describing the particular resource 16. For example, properties 54 may indicate that resource 16 is a conference room enabled with video conferencing equipment. Properties 54 may also indicate times during which the particular resource 16 is available to user 14. Email address 56 may store an email address corresponding to the particular resource 16. In some embodiments, email address 56 is simply used to uniquely identify the corresponding resource 16. For example, resource 16 may have a user account with calendar server 18, which includes an email address, allowing resource 16 to be identified as a required participant in a scheduled call. In certain embodiments, email address 56 contains a different method of identifying resource 16 to calendar server 18. In other embodiments, email address 56 is used to communicate with resource 16. In particular embodiments, conference memory 44 also stores an email address corresponding to conference control server 22. Conference control server 22 may use this email address to send confirmation emails to organizer through user 14 or information to resources 16.

As illustrated, resource information 46 also includes phone identification 58. In some embodiments, phone identification may be a phone number corresponding to resource 16. For example, if resource 16 is a conference room enabled with video conferencing equipment, phone identification 58 would indicate the phone number corresponding to equipment in that conference room. In other embodiments, phone identification 58 stores an IP address or any other suitable identification that can be used by call server 20 to access and identify resource 16. Finally, time of last query 60 indicates the last time that the calendar corresponding to that resource 16 was queried by conference control server 22. In some embodiments, conference control server 22 queries calendar server 18 regarding a particular resource 16 after receiving an update notification from calendar server 18 indicating a change to the calendar of resource 16. When conference control server 22 queries calendar server 18, time of last query 60 may be reset to reflect the most recent time that the calendar of resource 16 was queried. In particular embodiments, conference control server 22 specifies time of last query 60 when querying calendar server 18 regarding a calendar so that calendar server 18 need only return changes made to that calendar since time of last query 60, as will be described in more detail with respect to FIG. 6.

Conference memory 44, as illustrated, also includes meeting database 48. In general, meeting database 48 stores information regarding scheduled meetings known to conference control server 22. In particular embodiments, scheduled calls are stored in meeting database 48 after conference control server 22 receives the information from calendar server 18. In certain embodiments, conference control server 22 sends an update notification request to calendar server 18 for resources 16 maintained in resource information 46. When the calendar corresponding to a particular resource 16 is updated, calendar server 18 sends an update notification to conference control server 22. Conference control server 22 then queries calendar server 18 for changes to the calendar of that resource 16. In response to this query, conference control server 22 may receive information about a newly added meeting. When a meeting has been added to the calendar of a resource, conference control server 22 stores the information regarding the meeting either in meeting database 48 or as a recurring meeting 50.

In the illustrated embodiment, meeting database 48 includes nine columns: meeting ID 54, date 56, start time 58, duration 60, resource A 62, resource B 64, type 66, organizer 58, and subject 70. As illustrated, meeting database 48 includes information corresponding to only one meeting, a call, which is identified by a meeting identification (meeting ID) 54, namely $ID_1$. Meeting ID 54 provides a unique identification for the particular meeting stored in meeting database 48. In some embodiments, meeting ID 54 uniquely identifies a scheduled call to both calendar server 18 and conference control server 22. Date 56 indicates the date on which the scheduled call is to occur. Likewise, start time 58 provides the time at which the call is scheduled to start, and duration 60 indicates the scheduled duration of the call. Resource A 62 and resource B 64 indicate the two endpoints for the scheduled call. In certain embodiments, resource A 62 and/or resource B 64 comprise resources 16. In particular embodiments, meeting database 48 may store contact identifiers for the endpoints of the scheduled call as resource A 62 and resource B 64. In certain embodiments, the contact identifier is a fully qualified number. In other embodiments, the contact identifier may be an email address or any appropriate way of communicating with, identifying, or locating endpoints of the scheduled call. Type 66 may indicate the type of meeting scheduled, and organizer 68 may store the organizer of the scheduled call. In the illustrated embodiment, meeting $ID_1$ is a video conference call organized through user 14. Subject 70 may store the purpose of the scheduled call, which, in the illustrated embodiment is "status report." In some embodiments, identification of start time 58, duration 60, resource A 62, resource B 64, type 66, organizer 68, and subject 70 are sent to call server 20 prior to start time 58 so that call server 20 can perform setup procedures and establish a connection for the call prior to the scheduled meeting time. In certain embodiments, the information stored by meeting database 48 is sent to the corresponding resources 16. For example, in the illustrated embodiment, resource 16a and resource 16b may receive information regarding start time 58, duration 60, the other resource 62 or 64, type 66, organizer 68, and subject 70. In particular embodiments, meeting database 48 also includes information regarding other required resources 16 for the scheduled call. While meeting database 48 is illustrated as having a particular configuration and arrangement of certain information, it is understood that meeting database 48 may include any appropriate information for storing information regarding a scheduled call.

As illustrated, conference memory 44 also includes recurring meetings 50. When conference control server 22 gets information from calendar server 18 regarding a new meeting that recurs at particular intervals, conference control server 22 creates a recurring meeting 50. In some embodiments, calendar server 18 informs conference control server 22 that a new recurring meeting has been created in the information sent to conference control server 22 regarding the meeting. Recurring meeting 50 may be used to store these recurring meetings. Each recurring meeting 50 includes master 72 and one or more exceptions 74. By storing a recurring call as one of recurring meetings 50, each instance of the scheduled call may be easier to determine. Master 72 stores the information needed to determine each instance of the call as scheduled to recur. For example, master 72 may contain information such as start date, start time, duration, resource A, resource B, and the frequency of the scheduled call. Exceptions 74 may be used to store any deviations to the regularly scheduled recurring meeting reflected in master 72. In some embodiments, an exception 74 is created when one particular instance of the scheduled call is deleted or modified. For example, a recurring meeting 50 may be a video conference that is scheduled to recur every Tuesday at 1:00 p.m. Eastern Standard Time. Thus, master 72 may store: Tuesdays, every week, at 1:00 p.m. EST, in a particular location, using a particular device, and any other suitable information to describe the recurring meeting 50. Exception 74 may be created for a Tuesday on which the scheduled call will not occur. Also, exception 74 may be created for a Tuesday on which the scheduled call will occur one hour later than its regularly scheduled time. In general, recurring meeting 50, master 72, and exception 74 are used to populate meeting database 48 with scheduled calls that recur on at particular intervals.

Software 52 may also be included to facilitate execution of operations in conference control server 22. Software 52 may include any suitable programs, software, hardware, logic or circuitry and may be capable when executed to control the operation of various elements in conference control server 22 and to perform any other functions required by conference control server 22. Software 52 may or may not be included in conference control server 22.

Particular embodiments of conference control server 22 for accessing calendar server 18, which stores information about scheduled calls, and facilitating initiation of the scheduled calls have been described and are not intended to be all inclusive. While conference control server 22 is depicted as containing a certain configuration and arrangement of elements, it should be noted that this is a logical depiction and the components and functionality of conference control server 22 may be combined, separated, and distributed as appropriate both logically and physically. Also the functionality of conference control server 22 may be provided by any suitable collection and arrangement of components. The functions performed by the various components of conference control server 22 may be accomplished by any suitable devices to access calendar server 18, store information about scheduled calls, and facilitate the initiation of the scheduled calls.

Figure 3:
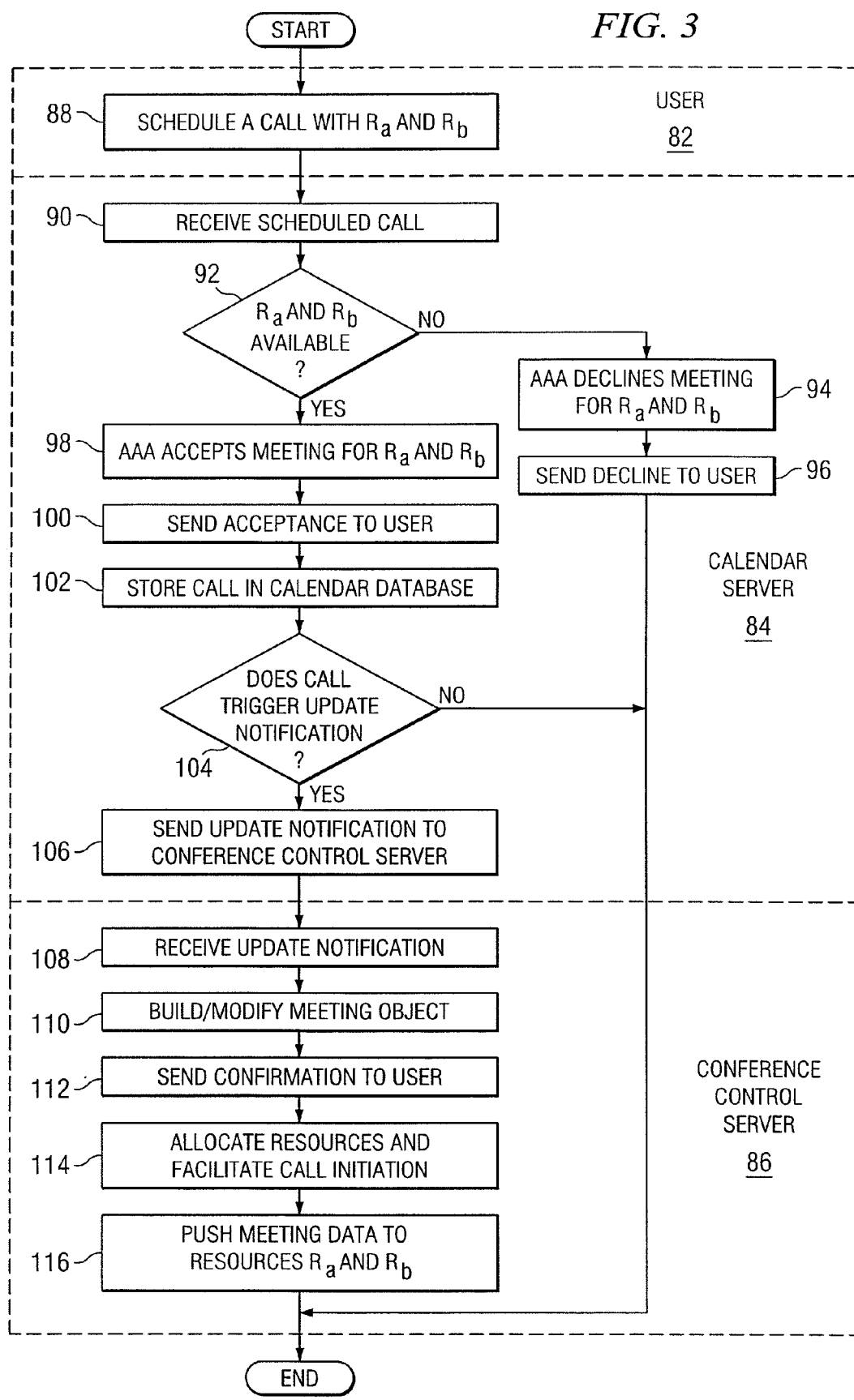
FIG. 3 is a flowchart illustrating the process of scheduling a call and the ensuing interaction between a user, a calendar server, and a conference control server.

FIG. 3 is a flowchart, indicated generally at 70, illustrating the process of scheduling a call and the ensuing interaction between user 14, calendar server 18, and conference control server 22. In the illustrated embodiment: box 82 corresponds to actions taken by an organizer through user 14, box 84 corresponds to actions taken by calendar server 18, and box 86 corresponds to actions taken by conference control server 22.

In step 88, an organizer, through user 14, schedules a call that specifies resource 16a and resource 16b as required participants. Calendar server 18 receives the scheduled call at step 90. In step 92, automated reservation agent 26 in calendar server 18 determines whether resource 16a and resource 16b are available. If either resource 16a or resource 16b are not available at the scheduled meeting time, automated reservation agent 26 declines the meeting for resource 16a and/or resource 16b at step 94. Then, in step 96, calendar server 18 sends a declined meeting message to the organizer through user 14 and method 80 ends. In some embodiments, the declined meeting message specifies why the scheduled call was declined. If, however, in step 92 automated reservation agent 26 determines that both resource 16a and resource 16b are available at the scheduled meeting time, then automated reservation agent 26 accepts the scheduled meeting on behalf of both resource 16a and resource 16b in step 98. Then, in step 100, calendar server 18 sends an accepted meeting message to the organizer through user 14.

In step 102, calendar server 18 stores information regarding the scheduled call in calendar database 30. In particular embodiments, the scheduled call is assigned a unique meeting identification (meeting ID) by calendar server 18. In some embodiments, calendar database 30 stores the scheduled call, possibly including the meeting ID, in the calendar of each call participant and required resource 16. In other embodiments, calendar database 30 stores the newly scheduled call in any appropriate manner. In step 104, calendar server 18 determines whether the newly scheduled call triggers an update notification. If an update notification is not triggered, method 80 ends. However, if an update notification is triggered, calendar server 18 sends an update notification to conference control server 22 at step 106. In some embodiments, this update notification only indicates that the calendar corresponding to a particular resource 16 has been modified. In other embodiments, the update notification sent by calendar server 18 provides conference control server 22 with additional information regarding the changes to the calendar of resource 16. For example, calendar server 18 may provide conference control server 22 with both an identification of which resource 16 and the meeting ID for the change.

In step 108, conference control server 22 receives the update notification from calendar server 18. Then, at step 110, conference control server 22 builds and/or modifies a stored meeting in response to receiving the notification. The process of building and/or modifying a meeting object is illustrated and described more fully in FIG. 6. In step 112, conference control server 22 sends a confirmation to the organizer through user 14. In some embodiments, this confirmation is an e-mail message containing a link to a website. The organizer may access the website in order to obtain additional information regarding the scheduled call. For example, the organizer can view, add, and modify resources 16 required for the scheduled call. In some embodiments, the organizer can view, add, and modify other information regarding the scheduled call. For example, the organizer may set a privacy level or identify the purpose of the scheduled call.

In step 114, conference control server 22 allocates any required resources 16 and facilitates initiation of the scheduled meeting. In some embodiments, conference control server 22 facilitates initiation of the scheduled meeting by sending information to call server 20. For example, conference control server 22 may provide call server 20 with phone identification 58 corresponding to any resources 16 required for the call. Call server 20 may use phone identification 58 to perform setup and initialization procedures for the scheduled call. In particular embodiments, conference control server 22 facilitates the initiation of a video conference between one of resources 16 and another one of resources 16. Conference control server 22 may then obtain phone identification 58 corresponding to resources 16a and 16b, for example, and send this information to call server 20. Call server 20 may then initiate the video conference setup prior to the scheduled meeting time. Call server 20 may perform this setup and establishment for a call, for example a video conference call, prior to the scheduled start time so that the organizer can access the video conference call at the scheduled time. In step 116, conference control server 22 may push information regarding the scheduled call to resources 16, if necessary, in order to facilitate initiation of the call. After step 116, method 80 ends.

The method described with respect to FIG. 3 is merely illustrative, and it is understood that the manner of operation and devices indicated as performing the operations may be modified in any appropriate manner. While the method describes particular steps performed in a specific order, it should be understood that system 10 contemplates any suitable collection and arrangement of elements performing some, all, or none of these steps in any operable order.

Figure 4:
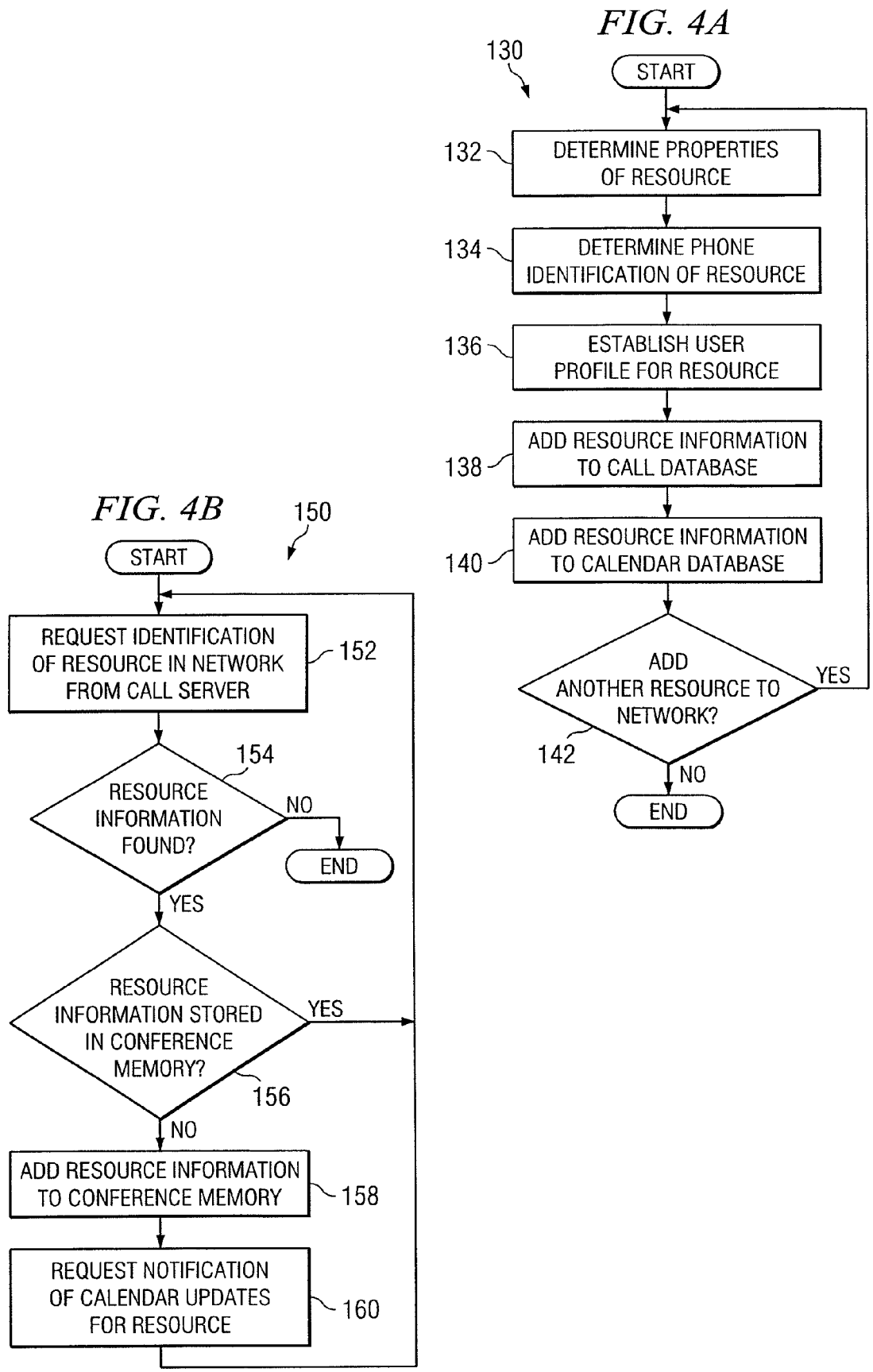
FIGS. 4A-B are flowcharts illustrating methods of adding resources to a system in which a calendar server can be accessed to facilitate initiation of a scheduled call.

FIGS. 4A-B are flowcharts illustrating methods of adding resources 16 to network 12 in which calendar server 18 can be accessed to facilitate initiation of a scheduled call. FIG. 4A illustrates a method, indicated generally at 130, for initializing the operation of certain elements within network 12 when one or more resources 16 need to be added. In particular embodiments, the existence of resources 16 can be automatically detected by elements in network 12. However, in some cases, an administrator must inform certain elements of the presence of resources 16. The administrator may be any suitable individual and or applications that maintain elements within network 12.

In step 132, an administrator determines certain properties regarding the particular resource 16 that the administrator wants to add to network 12. In some embodiments, these properties can include information similar to properties 54 stored in conference memory 44. Then, in step 134, the administrator determines any phone identification information for resource 16. For example, phone identification information could include phone identification 58, which may provide a phone number that identifies resource 16 to call server 20. The administrator, possibly by interacting with calendar server 18, establishes a user profile for resource 16 at step 136. In some embodiments, establishing a user profile includes providing an e-mail address such as is stored in e-mail address 56 in resource information 46. In particular embodiments, calendar server 18 is responsible for establishing a user profile for resource 16. In other embodiments, an administrator provides elements in network 12 with information regarding resource 16.

In step 138, the administrator adds information regarding resource 16 to call database 36 in call server 20. In some embodiments, resource information includes the properties, phone identification, and user profile determined and/or established in steps 132, 134 and 136. In other embodiments, resource information may include more or less information as appropriate. The administrator then adds the resource information to calendar database 30 at step 140. In some embodiments, calendar database 30 receives the same information as call database 36. In other embodiments, the resource information stored in calendar database 30 differs from resource information stored in call database 36 as appropriate. In step 142, the administrator determines whether or not to add another resource 16 to network 12. If another resource will not be added, then method 130 ends; however, if the administrator determines that another resource 16 should be added, then method 130 returns to step 132.

FIG. 4B illustrates a method, indicated generally at 150, for automatically initializing particular elements of system 10. For example, method 150 may inform conference control server 22 of the existence of added resources 16. In some embodiments, conference control server 22 repeats method 150 periodically in order to obtain information regarding any resources 16 added to network 12. In other embodiments, conference control server 22 is provided a notification that one of resources 16 was added to network 12 so that conference control server 22 can execute a method similar to method 150 to discover information regarding the newly added resource 16.

In step 152, conference control server 22 requests an identification of one of resources 16 from call server 20. In the illustrated embodiment, conference control server 22 requests information regarding each resource 16 individually; however, in other embodiments, conference control server 22 requests information for all resources 16 simultaneously. In particular embodiments, conference control server 22 only requests an identification of resources 16 added to network 12 since the last query sent by conference control server 22 to call server 20. In other embodiments, conference control server 22 requests an identification of all resources 16 in network 12 known to call server 20. At step 154, conference control server 22 determines whether call server 20 returned information regarding one of resources 16. In some embodiments, call server 20 indicates that no resources 16, or no new resources 16, are found in network 12 by failing to return a response to the query by conference control server 22. In other embodiments, conference control server 22 receives a message from call server 20 that indicates whether the requested resources 16 exist. If resource information is not returned by call server 20 at step 154, then method 150 ends. Otherwise, conference control server 22 determines whether or not information regarding that resource 16 is stored in conference memory 44. If information regarding that resource is stored in conference memory 44, then method 150 returns to step 152 where conference control server 22 requests identification of another resource 16 in network 12 from call server 20. However, if information regarding that resource 16 is not stored in conference memory 44, method 150 proceeds to step 158.

Conference control server 22 adds the information regarding resource 16 to conference memory 44 at step 158. In some embodiments, conference control server 22 adds information regarding resource 16 to conference memory 44 by adding an entry to resource information 46. In particular embodiments, conference control server 22 retrieves all information necessary to populate resource information 46 from call server 20. In other embodiments, portions of resource information 46 may be obtained from other elements in any suitable manner. Finally, in step 160, conference control server 22 sends an update notification request to calendar server 18, which requests notification of any updates to the calendar of resource 16. In particular embodiments, calendar server 18 stores a trigger for the update notification in calendar database 30. After step 160, method 150 returns to step 152, where conference control server 22 asks call server 20 to identify another resource 16.

The methods described with respect to FIGS. 4A and 4B are merely illustrative, and it is understood that the manner of operation and devices indicated as performing the operations may be modified in any appropriate manner. While methods 130 and 150 describe particular steps performed in a specific order, it should be understood that system 10 contemplates any suitable collection and arrangement of elements performing some, all, or none of these steps in any operable order.

Figure 5:
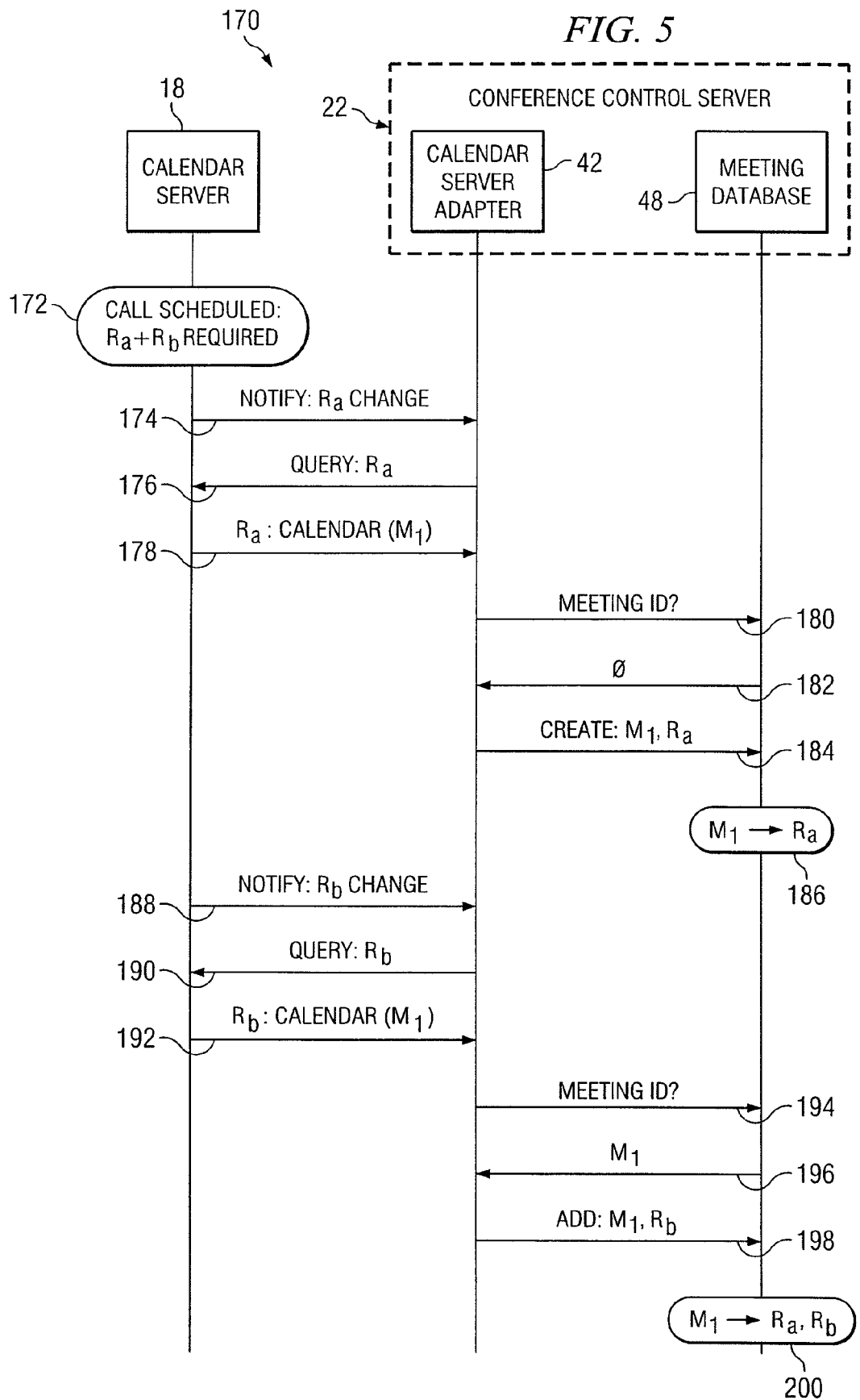
FIG. 5 illustrates a signal bounce diagram showing communications between a calendar server and a conference control server after a call is scheduled that identifies two resources as required participants.

FIG. 5 illustrates a signal bounce diagram, indicated generally at 170, showing communications between calendar server 18 and conference control server 22 after a call is scheduled that identifies resources 16a and 16b as required participants. Some communications within conference control server 22, specifically between calendar server adapter 42 and meeting database 48, are also shown by signal bounce diagram 170.

At time 172, a call is scheduled that indicates that resources 16a and 16b are required participants. In some embodiments, an organizer through user 14 schedules the call, and the call is stored in calendar database 30 of calendar server 18. With signal 174, calendar server 18 notifies conference control server 22 that the calendar of resource 16a has changed. In particular embodiments, the notification merely indicates that the calendar of resource 16a has changed. In other embodiments, the notification also provides information about the change. Signal 174 is received by calendar server adapter 42, who sends a query regarding resource 16a to calendar server 18 as signal 176. In particular embodiments, this query specifies the last time that the calendar of resource 16a was queried for updates, e.g. time of last query 60 corresponding to resource information 46 regarding resource 16a. When time of last query 60 is included in the query, calendar server 18 may respond with only changes to the calendar that have occurred since time of last query 60. In certain embodiments, this query specifies a time period for which the calendar of resource 16a should be returned. After signal 176 is received by calendar server 18, calendar server 18 responds with the calendar updates for resource 16a through signal 178. In certain embodiments, calendar server 18 may send a plurality of calendar updates in signal 178. In some embodiments, calendar server 18 communicates calendar updates by sending the current calendar corresponding to the resource 16a for the next few days, or for another period of time.

In the illustrated embodiment, the calendar update sent by calendar server 18 contains a meeting identification (meeting ID: $M_1$) which uniquely identifies the scheduled call. After receiving the calendar update, calendar server adapter 42 queries meeting database 48, signal 180, to determine whether the meeting $M_1$ is already stored in meeting database 48. If $M_1$ is not stored in meeting database 48, then conference control server 22 must add meeting $M_1$ to meeting database 48. In the illustrated embodiment, $M_1$ is not stored in meeting database 48, so meeting database 48 returns a null response, signal 182. With signal 184, calendar server adapter 42 instructs meeting database 48 to add an entry for the scheduled call, including the meeting ID ($M_1$) and identifying an required resources (16a). At time 186, meeting database 48 adds meeting $M_1$, which identifies resource 16a as a required participant.

With signal 188, calendar server 18 notifies conference control server 22 of a change to the calendar of resource 16b. In the illustrated embodiment, calendar server 18 provides conference control server 22 with an update notification for every resource 16 that has an associated trigger. Thus, in some instances, conference control server 22 will be provided two separate notifications regarding the same meeting. In other embodiments, calendar server 18 provides conference control server 22 with one update notification when the calendar of more than one resource 16 is updated because of a change to the same call. Calendar server adapter 42 replies with signal 190, which is a query regarding resource 16b. Similar to the process described above with respect to resource 16a, calendar server adapter 42 may specify time of last query 60 to limit the information returned by the query. In signal 192, calendar server 18 transmits calendar updates for resource 16b. Calendar server adapter 42 then queries meeting database 48, signal 194, to determine whether the meeting ID identified by the calendar update is stored in meeting database 48. In the illustrated embodiment, this meeting ID is the same as for resource 16a: $M_1$. Meeting database 48 determines that $M_1$ exists in meeting database 48 and responds with signal 196, which identifies meeting $M_1$. Then, calendar server adapter 42 sends signal 198, which instructs meeting database 48 to add resource 16b as a required participant in meeting $M_1$. At time 200, meeting database 48 still stores meeting $M_1$, but now shows two required participants for meeting $M_1$: resource 16a and resource 16b.

The signal bounce diagram described with respect to FIG. 5 is merely illustrative, and it is understood that the manner of operation and devices indicated as performing the operations may be modified in any appropriate manner. While the method describes particular steps performed in a specific order, it should be understood that system 10 contemplates any suitable collection and arrangement of elements performing some, all, or none of these steps in any operable order.

Figure 6:
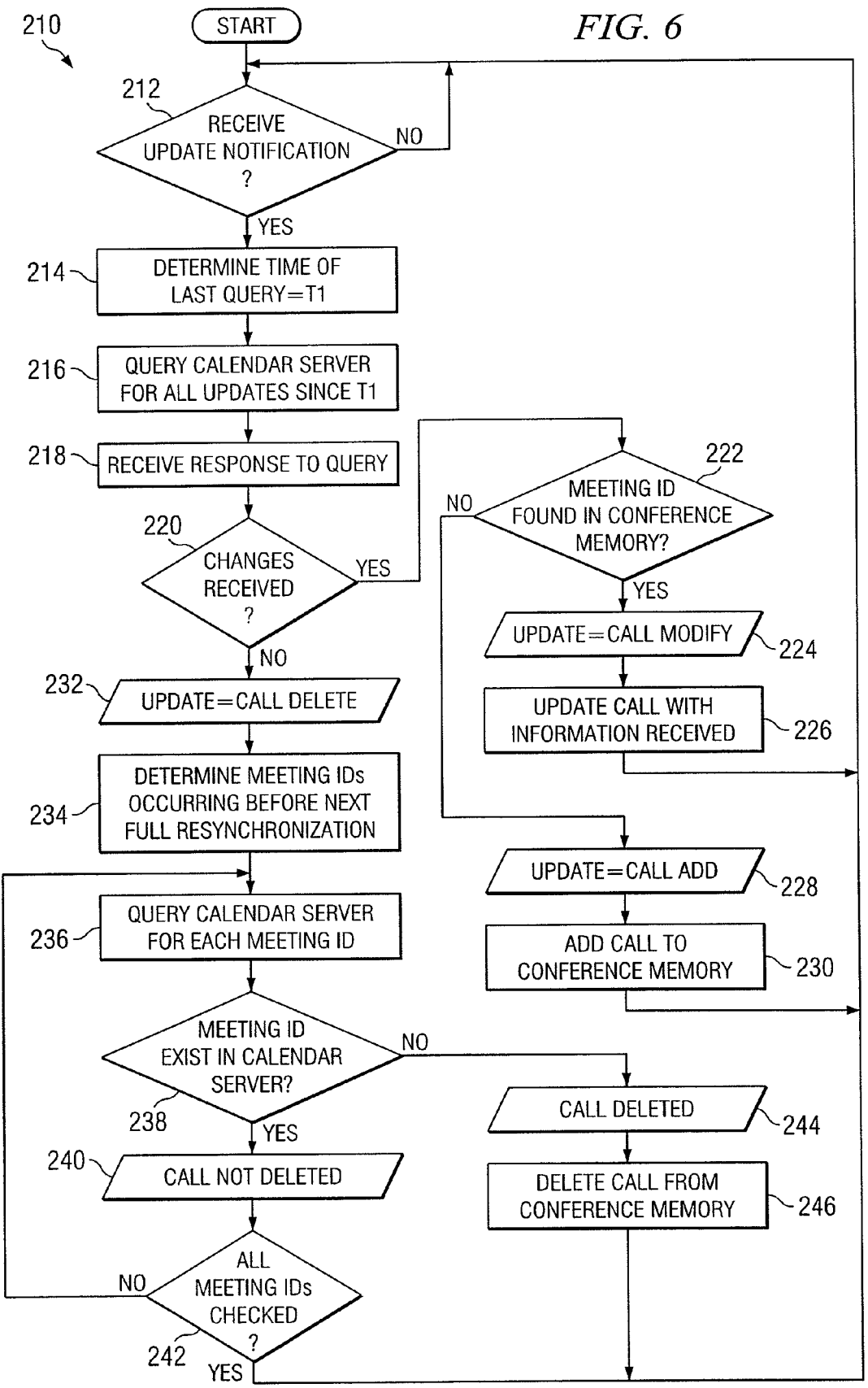
FIG. 6 is a flowchart illustrating a method where a conference control server responds to an update notification received from a calendar server.

FIG. 6 is a flowchart illustrating a method, indicated generally at 210, whereby conference control server 22 may receive and process an update notification from calendar server 18. In step 210, conference control server 22 determines whether or not conference control server 22 has received an update notification from calendar server 18. If no notification has been received, method 210 returns to step 212.

When an update notification is received, conference control server 22 identifies which resource's 16 calendar was updated at step 214. Using that information, conference control server 22 determines the last time conference control server 22 sent a query to calendar server 18 regarding the calendar of that resource 16. In particular embodiments, that time is stored in conference memory 44 as time of last query 60. In the illustrated embodiment, time of last query 60 is equal to T1. In certain embodiments, the query is made using a different time period than the time of last query. In step 216, conference control server 22 queries calendar server 18 for all updates made to the calendar of resource 16 since time T1. In step 218, conference control server 22 receives any calendar updates from calendar server 18. In some embodiments, calendar server 18 will send a null response to conference control server 22 to indicate that the calendar of resource 16 has not changed since time T1. In particular embodiments, the calendar updates are organized by meeting ID, which uniquely indicates a scheduled call. The calendar update may contain a meeting ID and other information regarding the scheduled call. In step 220, conference control server 22 determines whether or not any calendar updates were received in step 218.

If conference control server 22 received calendar updates for resource 16, then conference control server 22 determines whether or not the scheduled call is already stored in conference memory 44 at step 222. In some embodiments, calendar updates contain a meeting ID, which uniquely identifies the scheduled call. Conference control server 22 may access meeting database 48 to determine whether the meeting ID is already stored. If the meeting is found in conference memory 44, then the calendar change was an update to a scheduled call, box 224. In step 226, conference control server 22 updates meeting database 48 to reflect the new information received from calendar server 18. Then, method 210 returns to step 212. However, if the meeting is not found in conference memory 44, then the calendar change was the scheduling of a new call, box 228. In step 230, conference control server 22 adds the new scheduled call to meeting database 48, and method 210 then returns to step 212.

If, in step 220, conference control server 22 did not receive calendar updates from calendar server 18, then the calendar of resource 16 was updated because a scheduled call was deleted, box 232. In step 234, conference control server 22 determines all meeting IDs occurring before the next full resynchronization. In particular embodiments, conference control server 22 periodically performs a full resynchronization to ensure that information stored in conference memory 44 has been appropriately updated. Conference control server 22 may perform a full resynchronization once a day or at any appropriate interval. In a full resynchronization, conference control server 22 may query calendar server 18 regarding each meeting ID known to conference control server 22. Conference control server 22 may also ask calendar server 18 for the calendar corresponding to resources 16 for a particular time period. In certain embodiments, conference control server 22 requests the calendar corresponding to resources 16 for the past 24 hours, in order to ensure no time-zone issues prevent identification of a call scheduled in the future, and for the next thirty days.

In step 236, conference control server 22 queries calendar server 18 for the first meeting ID obtained in step 234. In some embodiments, calendar server 18 returns information for the scheduled call corresponding to meeting ID if the meeting ID exists in calendar database 30. In step 238, conference control server 22 determines whether or not the meeting ID corresponds to a meeting stored in calendar server 18. In some embodiments, conference control server 22 makes this determination based upon the information received from calendar server 18 in step 236. If the meeting ID exists in calendar server 18, then that particular call was not deleted, box 240. In step 242, conference control server 22 determines whether or not calendar server 18 has been queried for all meeting IDs identified in step 234. If so, then method 210 returns to step 212; otherwise, method 210 returns to step 236 to query calendar server 18 regarding the next meeting ID.

If, in step 238, conference control server 22 determines that calendar server 18 no longer contains an entry for the meeting ID, then that particular call has been deleted, box 244. In step 246, conference control server 22 deletes the call corresponding to that meeting ID from conference memory 44. In some embodiments, conference control server 22 deletes the scheduled call from meeting database 48. In particular embodiments, the deleted call may be one of masters 72, requiring the deletion of the corresponding recurring meeting 50. After step 246, method 210 returns to step 212.

The method described with respect to FIG. 6 is merely illustrative, and it is understood that the manner of operation and devices indicated as performing the operations may be modified in any appropriate manner. While the method describes particular steps performed in a specific order, it should be understood that system 10 contemplates any suitable collection and arrangement of elements performing some, all, or none of these steps in any operable order.

Although the present invention has been described in several embodiments, a myriad of changes and modifications may be suggested to one skilled in the art, and it is intended that the present invention encompass such changes and modifications as fall within the present appended claims.

What is claimed is:

1. A method for integrating a calendar server and a conference control server comprising:
   identifying a plurality of conferencing resources, each of the conferencing resources having an associated resource identifier;
   for each of the conferencing resources, registering with a calendar server using the associated resource identifier to request notifications of updates to a calendar associated with the resource identifier;
   receiving a first update notification from the calendar server, the first update notification indicating a first one of the resource identifiers;
   receiving a second update notification from the calendar server, the second update notification indicating a second one of the resource identifiers;
   determining meeting information for a scheduled call indicated by the first update notification and the second update notification, the meeting information comprising a scheduled time and identifying a first one of the conferencing resources associated with the first resource identifier and a second one of the conferencing resources associated with the second resource identifier, the meeting information further comprising a contact identifier for the second conferencing resource; and
   providing at least a portion of the meeting information to the first conferencing resource, the portion comprising the scheduled time and the contact identifier.

2. The method of claim 1, wherein determining the meeting information comprises:
   sending a first query to the calendar server in response to receiving the first update notification, the query specifying the first resource identifier and a time period and requesting the updates to the calendar associated with the first resource identifier;
   sending a second query to the calendar server in response to receiving the second update notification, the query specifying the second resource identifier and a second time period and requesting the updates to the calendar associated with the second resource identifier;
   receiving a first response to the first query, the first response including a meeting identifier, the scheduled time, and the first resource identifier; and
   receiving a second response to the second query, the second response including the meeting identifier, the scheduled time, and the second resource identifier.

3. The method of claim 1, further comprising:
   receiving a third update notification from the calendar server, the third update notification indicating the first resource identifier;
   sending a query to the calendar server in response to receiving the third update notification, the query specifying the first resource identifier and a time period and requesting updates to the calendar associated with the first resource identifier;
   receiving a response to the query;
   determining whether the response includes a meeting identifier associated with the scheduled call; and
   if the response does not include the meeting identifier, deleting meeting information associated with the scheduled call from a meeting database.

4. The method of claim 3, wherein the time period is selected to request the updates to the calendar made since a previous query was sent to the calendar server.

5. The method of claim 1, further comprising:
receiving a third update notification from the calendar server, the third update notification indicating the first resource identifier;
sending a query to the calendar server in response to receiving the third update notification, the query specifying the first resource identifier and a time period and requesting the updates to the calendar associated with the first resource identifier;
receiving a response to the query;
determining that the response does not include a meeting identifier associated with any scheduled call;
determining one or more meeting identifiers from a meeting database, the meeting identifiers each identifying a scheduled call; and
for each of the meeting identifiers:
sending a second query specifying the meeting identifier to the calendar server;
receiving a second response to the second query;
determining whether the second response indicates that the calendar server has meeting information corresponding to the scheduled call indicated by the meeting identifier; and
if the calendar server does not have the meeting information, identifying the scheduled call corresponding to the meeting identifier as a deleted meeting.

6. The method of claim 1, further comprising:
storing the meeting information in a meeting database; and
periodically synchronizing with the calendar server in order to verify that the meeting database contains accurate meeting information.

7. The method of claim 1, wherein the meeting information further comprises an organizer and a subject, the method further comprising:
determining whether the scheduled call can be initiated given the meeting information; and
notifying the organizer of the determination.

8. The method of claim 1, wherein the contact identifier is a fully qualified number.

9. The method of claim 1, wherein the calendar server comprises MICROSOFT EXCHANGE.

10. Logic for integrating a calendar server and a conference control server, the logic encoded in non-transitory media and operable when executed by a processor to:
identify a plurality of conferencing resources, each of the conferencing resources having an associated resource identifier;
for each of the conferencing resources, register with a calendar server using the associated resource identifier to request notifications of updates to a calendar associated with the resource identifier;
receive a first update notification from the calendar server, the first update notification indicating a first one of the resource identifiers;
receive a second update notification from the calendar server, the second update notification indicating a second one of the resource identifiers;
determine meeting information for a scheduled call indicated by the first update notification and the second update notification, the meeting information comprising a scheduled time and identifying a first one of the conferencing resources associated with the first resource identifier and a second one of the conferencing resources associated with the second resource identifier, the meeting information further comprising a contact identifier for the second conferencing resource; and
provide at least a portion of the meeting information to the first conferencing resource, the portion comprising the scheduled time and the contact identifier.

11. The logic of claim 10, wherein determining the meeting information comprises:
sending, a first query to the calendar server in response to receiving the first update notification, the query specifying the first resource identifier and a time period and requesting the updates to the calendar associated with the first resource identifier;
sending a second query to the calendar server in response to receiving the second update notification, the query specifying the second resource identifier and a second time period and requesting the updates to the calendar associated with the second resource identifier;
receiving a first response to the first query, the first response including a meeting identifier, the scheduled time, and the first resource identifier; and
receiving a second response to the second query, the second response including the meeting identifier, the scheduled time, and the second resource identifier.

12. The logic of claim 10, further operable to:
receive a third update notification from the calendar server, the third update notification indicating the first resource identifier;
send a query to the calendar server in response to receiving the third update notification, the query specifying the first resource identifier and a time period and requesting updates to the calendar associated with the first resource identifier;
receive a response to the query;
determine whether the response includes a meeting identifier associated with the scheduled call; and
if the response does not include the meeting identifier, delete meeting information associated with the scheduled call from a meeting database.

13. The logic of claim 12, wherein the time period is selected to request the updates to the calendar made since a previous query was sent to the calendar server.

14. The logic of claim 10, further operable to:
receive a third update notification from the calendar server, the third update notification indicating the first resource identifier;
send a query to the calendar server in response to receiving the third update notification, the query specifying the first resource identifier and a time period and requesting the updates to the calendar associated with the first resource identifier;
receive a response to the query;
determine that the response does not include a meeting identifier associated with any scheduled call;
determine one or more meeting identifiers from a meeting database, the meeting identifiers each identifying a scheduled call; and
for each of the meeting identifiers:
send a second query specifying the meeting identifier to the calendar server;
receive a second response to the second query;
determine whether the second response indicates that the calendar server has meeting information corresponding to the scheduled call indicated by the meeting identifier; and
if the calendar server does not have the meeting information, identify the scheduled call corresponding to the meeting identifier as a deleted meeting.

15. The logic of claim 10, further operable to:
store the meeting information in a meeting database; and
periodically synchronize with the calendar server in order to verify that the meeting database contains accurate meeting information.

16. The logic of claim 10, wherein the meeting information further comprises an organizer and a subject, the logic further operable to:
determine whether the scheduled call can be initiated given the meeting information; and
notify the organizer of the determination.

17. The logic of claim 10, wherein the contact identifier is a fully qualified number.

18. The logic of claim 10, wherein the calendar server comprises MICROSOFT EXCHANGE.

19. A device for integrating a calendar server and a conference control server comprising:
a calendar adapter operable to:
identify a plurality of conferencing resources, each of the conferencing resources having an associated resource identifier;
for each of the conferencing resources, register with a calendar server using the associated resource identifier to request notifications of updates to a calendar associated with the resource identifier;
receive a first update notification from the calendar server, the first update notification indicating a first one of the resource identifiers; and
receive a second update notification from the calendar server, the second update notification indicating a second one of the resource identifiers;
a conference controller operable to determine meeting information for a scheduled call indicated by the first update notification and the second update notification, the meeting information comprising a scheduled time and identifying a first one of the conferencing resources associated with the first resource identifier and a second one of the conferencing resources associated with the second resource identifier, the meeting information further comprising a contact identifier for the second conferencing resource; the conference controller further operable to provide at least a portion of the meeting information to the first conferencing resource, the portion comprising the scheduled time and the contact identifier.

20. The device of claim 19, wherein determining the meeting information comprises:
sending a first query to the calendar server in response to receiving the first update notification, the query specifying the first resource identifier and a time period and requesting the updates to the calendar associated with the first resource identifier;
sending a second query to the calendar server in response to receiving the second update notification, the query specifying the second resource identifier and a second time period and requesting the updates to the calendar associated with the second resource identifier;
receiving a first response to the first query, the first response including a meeting identifier, the scheduled time, and the first resource identifier; and
receiving a second response to the second query, the second response including the meeting identifier, the scheduled time, and the second resource identifier.

* * * * *